United States Patent
Downey

(10) Patent No.: US 9,840,192 B2
(45) Date of Patent: Dec. 12, 2017

(54) BLIND SPOT WARNING APPARATUS, ASSEMBLY AND METHOD

(71) Applicant: Steven G. Downey, Burlington, WI (US)

(72) Inventor: Steven G. Downey, Burlington, WI (US)

(*) Notice: Subject to any disclaimer, the term of this patent is extended or adjusted under 35 U.S.C. 154(b) by 0 days.

(21) Appl. No.: 14/626,197

(22) Filed: Feb. 19, 2015

(65) Prior Publication Data

US 2015/0232021 A1 Aug. 20, 2015

Related U.S. Application Data

(60) Provisional application No. 61/942,238, filed on Feb. 20, 2014.

(51) Int. Cl.
| | | |
|---|---|---|
| *B60Q 1/52* | (2006.01) | |
| *B60Q 1/30* | (2006.01) | |
| *B60Q 1/50* | (2006.01) | |
| *G08G 1/16* | (2006.01) | |
| *G01S 13/93* | (2006.01) | |

(52) U.S. Cl.
CPC ............ *B60Q 1/525* (2013.01); *B60Q 1/30* (2013.01); *B60Q 1/503* (2013.01); *G01S 2013/9332* (2013.01); *G08G 1/166* (2013.01)

(58) Field of Classification Search
CPC .......... B60Q 1/525; B60Q 1/30; B60Q 1/503; B60Q 9/008; G08G 1/166; G08G 1/167; G01S 2013/9332; G01S 2013/9385
See application file for complete search history.

(56) References Cited

U.S. PATENT DOCUMENTS

| 3,454,757 A | 7/1969 | Bell |
|---|---|---|
| 5,072,340 A | 12/1991 | Jones |

(Continued)

FOREIGN PATENT DOCUMENTS

GB 2350741 6/2000

OTHER PUBLICATIONS

Blind Spot Warning + Lane Change Warning, U.S. Department of Transportation, Research and Innovative Technology Administration, www.iteris.com website.

(Continued)

*Primary Examiner* — Hongmin Fan
(74) *Attorney, Agent, or Firm* — Joseph S. Heino

(57) ABSTRACT

A blind spot warning apparatus, system and method provide for an electrically-actuated blind spot detection sensor that is electronically or wirelessly connected to a programmable logic controller ("PLC"). The PLC is then electronically or wirelessly connected to at least one electrically-actuated light-emitting fixture that can be affixed to the exterior surface of a first vehicle. The light fixture is positioned to be easily visualized by the driver of a second vehicle. Visualization is accomplished by using letters, words, symbols or other warning indicia within the fixture to convey a visual warning to the driver of the second vehicle. Light fixture actuation is controlled by the PLC as to both the position of the second vehicle relative to the first vehicle and to the amount of time that the second vehicle remains in a particular blind spot position as detected by the detection sensor and processed via the PLC.

7 Claims, 4 Drawing Sheets

(56) References Cited

U.S. PATENT DOCUMENTS

| | | | |
|---|---|---|---|
| 5,786,772 A | | 7/1998 | Schofield et al. |
| 6,133,851 A | * | 10/2000 | Johnson .................. B60Q 1/30 340/431 |
| 6,734,807 B2 | | 5/2004 | King |
| 7,427,150 B2 | | 9/2008 | Carter et al. |
| 7,581,859 B2 | | 9/2009 | Lynam |
| 2005/0047158 A1 | | 3/2005 | Koehler |
| 2009/0063053 A1 | * | 3/2009 | Basson .................. G08G 1/167 702/1 |
| 2012/0191298 A1 | | 7/2012 | Schwarzhaupt et al. |
| 2013/0258688 A1 | * | 10/2013 | Kalapodas ............. B60Q 1/085 362/465 |
| 2014/0125474 A1 | * | 5/2014 | Gunaratne ............. G08G 1/163 340/439 |
| 2014/0218213 A1 | * | 8/2014 | Schneider ............. G08G 1/167 340/905 |

OTHER PUBLICATIONS

Preview Radar Systems, Preco Electronics, Inc., www.previewradar.com.

\* cited by examiner

BLIND SPOT WARNING APPARATUS, ASSEMBLY AND METHOD

This Application claims the benefit of U.S. Provisional Application No. 61/942,238, filed Feb. 20, 2014.

FIELD OF THE INVENTION

This invention relates generally to motor vehicles and to devices used with such motor vehicles. It also relates generally to warning devices that are used to improve the safe trafficking of motor vehicles and the persons who drive them. It also relates, in certain embodiments, to wireless technology to control the selective access of vehicle position information. More specifically, it relates to a blind spot warning apparatus that allows a first vehicle to sense when a second vehicle is in the driver of the first vehicle's "blind spot" and that provides a visual warning to the driver of the second vehicle such that the second vehicle can move out of the first vehicle's blind spot. It also relates specifically to a system that uses such apparatus and to a method of using such apparatus whereby letters, words, symbols or other warning indicia are used in conjunction with the system and method to convey the visual warning to the driver of the second vehicle. Further, the apparatus, system and methodology of the present invention can be provided by original equipment manufacturers ("OEM") and aftermarket retailers.

BACKGROUND OF THE INVENTION

It is well known in the art of motor vehicles in general, and in the art of semi-trucks (or "tractors") and trailers pulled by such semi-trucks, that visualization of other vehicles is often difficult, if not impossible, due to the size and configuration of such vehicles. In an attempt to visualize other vehicles, over-sized and parabolic mirrors and other devices have been utilized, particularly in the area of tractor-trailer combinations. All of those types of devices aid the driver of a first vehicle in visualizing a second vehicle prior to a lane change or other maneuver, but no one of them is completely fool-proof. Accordingly, blind spots continue to be a problem for drivers, particularly drivers of large tractor-trailer combinations and other large vehicles including, but not limited to, straight trucks, buses, motor homes and recreational vehicles.

In the experience of this inventor, such devices do absolutely nothing to alert the driver of the second vehicle of the fact that the second vehicle is actually in a blind spot of the first vehicle. Accordingly, there is a clear need for an apparatus, system and method that accomplishes the task of warning the driver of the second vehicle that the second vehicle is in the first driver's blind spot and that the second vehicle should move.

In the view of this inventor, there is also a need to provide such an apparatus, system and method that accomplishes the task of warning the driver of the second vehicle that the second vehicle is in the first driver's blind spot without being actuated each time the second vehicle enters or simply passes through that blind spot. To configure such an apparatus, system and method, it would be desirable to use a pre-programmed or programmable time-delay functionality such that the driver of the second vehicle is warned of its position within the blind spot of the first vehicle after a certain pre-programmed period or amount of time passes. This would avoid situations where the apparatus, system and method is triggered or over-actuated by a second vehicle that simply passes by the first vehicle, thereby passing relatively quickly through the blind spot.

It would also be desirable for the blind spot warning apparatus, system and method to be user-friendly and effective in all light conditions in which vehicles are driven. For example, the amount of illumination required from a light that is actuated for a day-time visual alert must be greater than that required for a night-time visual alert.

Lastly, it would also be desirable for the blind spot warning apparatus to utilize letters, words, symbols or other warning indicia to convey the visual warning to the driver of the second vehicle. Such warning indicia could be of the type that is unique to the apparatus or of the type that is universally understood to have a specific meaning.

SUMMARY OF THE INVENTION

The blind spot warning apparatus, system and method of the present invention has obtained these objects. It provides for at least one electrically-actuated blind spot detection sensor that is electronically or wirelessly connected to a programmable logic controller ("PLC"). The PLC is then electronically or wirelessly connected to at least one electrically-actuated light-emitting fixture that can be affixed to the exterior surface of a first vehicle. The light fixture is positioned in such a way that the fixture, when actuated, is easily visualized by the driver of a second vehicle. Visualization can be accomplished by using letters, words, symbols or other warning indicia within the fixture to convey a visual warning to the driver of a second vehicle.

Further, actuation of the light fixture should be controlled by the PLC in such a way that responds to both the position of the second vehicle relative to the first vehicle and to the amount of time that the second vehicle remains in a particular blind spot position as detected by the detection sensor and processed via the PLC. It is also to be understood that the PLC could control one light fixture and its component parts or multiple fixtures and their component parts. An electrical power supply is also provided which could be battery powered or connected to the electrical system of the first vehicle.

The blind spot warning apparatus, system and method of the present invention is user-friendly and effective in all light conditions and the amount of illumination required from a light that is actuated for a day-time visual alert must be greater than that required for a night-time visual alert. Further, the blind spot warning apparatus, system and methodology of the present invention can be provided by both original equipment manufacturers ("OEM") and aftermarket retailers.

The foregoing and other features of the present invention will be apparent from the detailed description that follows.

DETAILED DESCRIPTION

Figure 1:
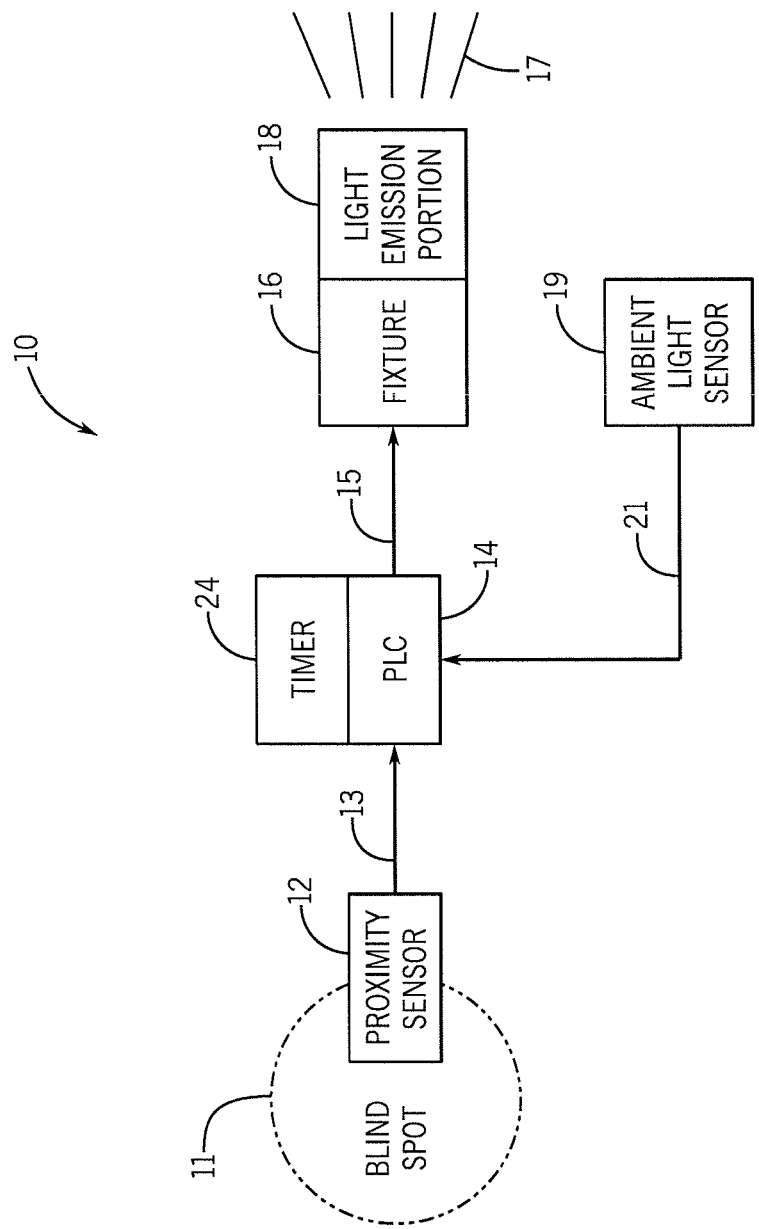
FIG. 1 is a schematic view of an assembly that is configured in accordance with the present invention.

Referring now to the drawings in detail wherein like numbers represent like elements throughout, FIG. 1 illustrates a schematic view of an assembly, generally identified 10, as it would be configured in accordance with the present invention. The assembly 10 is comprised of at least one blind spot or "proximity" sensor 12, at least one PLC 14 and at least one light fixture 16, the light fixture 16 having a visual indicator or a light emission component 18 coupled to it. The sensor 12, PLC 14 and fixture 16 are each provided with an electrical supply source (not shown), such as a battery. Alternatively, the power to the assembly 10 could be provided via an electrical connection to the vehicle. The blind spot sensor 12 is positioned so as to detect the presence of a moving object (not shown) that enters a blind spot 11. The sensor 12 is electrically connected 13 to, or wirelessly in communication with, the PLC 14.

When an object enters the blind spot 11, the PLC 14 is activated and begins a timing function. This timing function is programmable to set the PLC 14 in accordance with a desired period of time, such as 10 to 15 seconds. The PLC 14 can also be configured to eliminate increased power consumption due to the PLC 14 being required to "listen" for incoming signals from the sensor 12. Once activated, the PLC 14 counts the time that the object continues to be in the blind spot 11 via a timer 24. Once the pre-programmed amount of time passes, the PLC 14 actuates the fixture 16 that is electrically connected 15 to, or wirelessly in communication with, the PLC 14. The visual indicator portion 18 of the fixture 16 emits light 17 via a plurality of diodes or backlit screen with a message that is visualized by the driver of the object that is in the blind spot 11. See FIGS. 3A and 3B.

Although the schematic illustrated in FIG. 1 shows the assembly 10 as having its elements "hard-wired" to one another, it is to be understood that the elements of the assembly 10 could also use wireless technology to accomplish the same functionality and wireless communication between the elements shown is within the scope of the present invention. It is also within the scope of the present invention to use a combination of hard-wired and wireless components or elements in the assembly 10 and such is not a limitation of the present invention. Further, it is also possible with the assembly 10 of the present invention that each fixture 16 is electronically-driven by its own PLC 14. That is, the present invention is not limited to a single PLC 14 as a processor for the complete assembly 10. It is within the scope of the present invention that the use of more than one PLC 14 is contemplated and such is not a limitation of the present invention.

The present invention also implements means to adjust the intensity of the light emitted 17 from the visual indicator portion 18 depending on a secondary sensor 19 that senses ambient light conditions. This ambient light sensor 19 is electrically connected 21 to, or wirelessly in communication with, the PLC 14. In situations where the assembly 10 is used in full daylight, the intensity of the light emitted 17 is greater. At dusk, the emitted light intensity can be lessened. In full darkness, the intensity can be minimal. The key point here is that the light intensity is adjustable based on the ambient light that is sensed.

Figure 2:
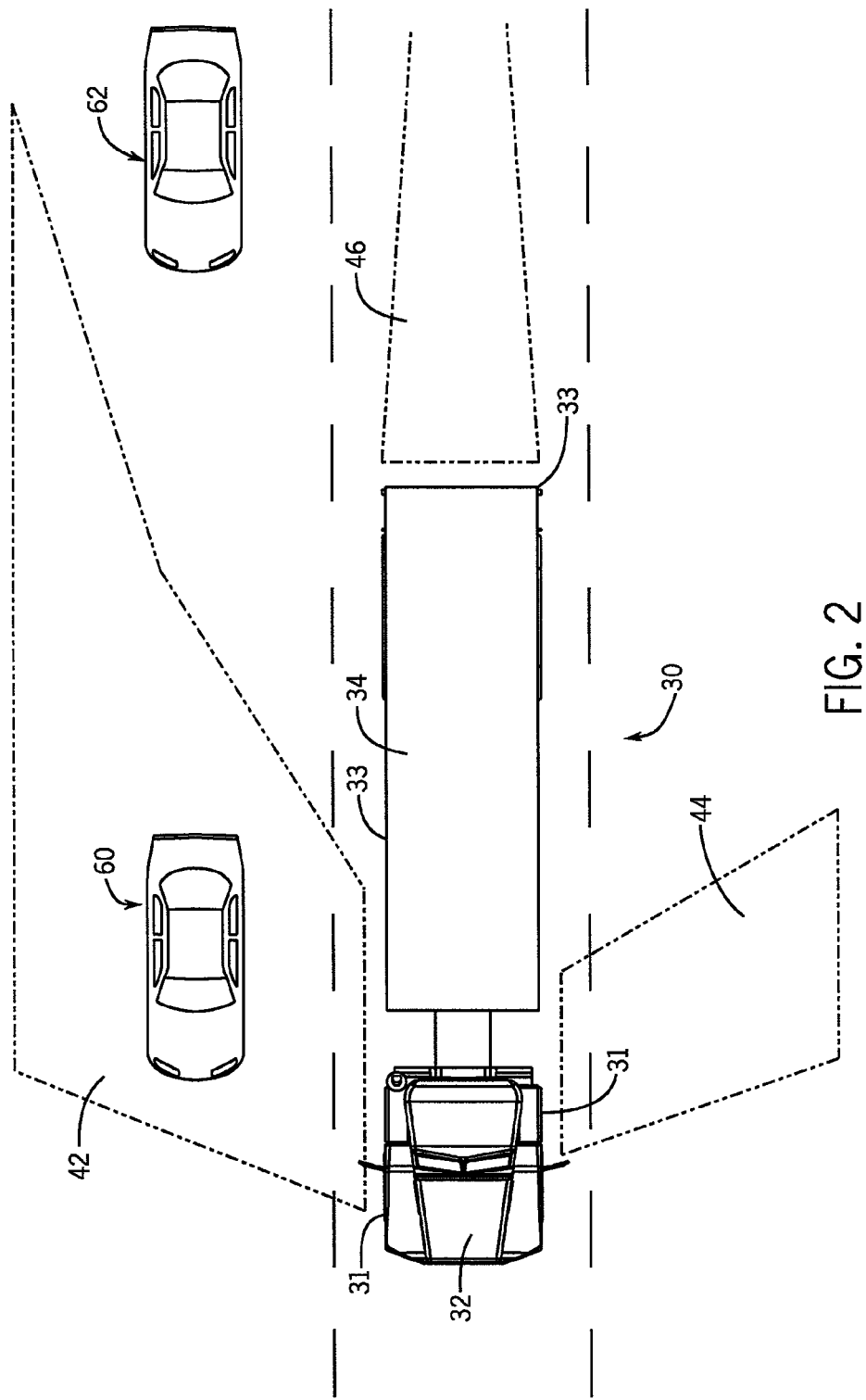
FIG. 2 is a top plan view of a tractor-trailer combination with which the present invention would be used.
Figure 4:
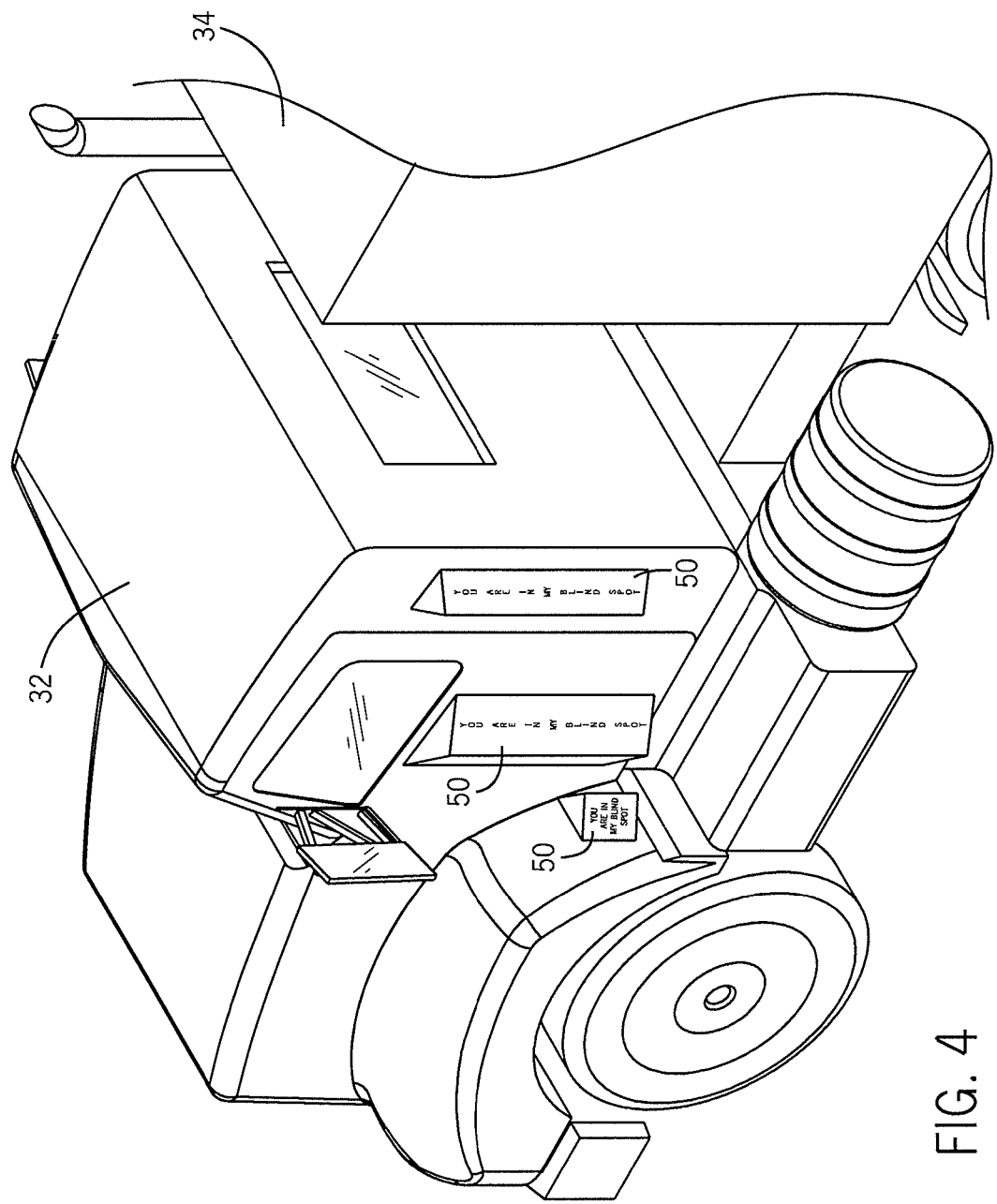
FIG. 4 is a perspective view of a portion of a tractor-trailer combination and showing placement of the light fixtures in accordance with the present invention.

In application, the proximity sensor 12 can be mounted, for example, at a number of locations 31 on the tractor 32 and/or a number of locations 33 on the trailer 34 of a representative tractor-trailer combination 30. See FIGS. 2 and 4. The proximity sensor 12 is adjustable for size and distance, which corresponds roughly to multiple blind spots 42, 44, 46 that are created at various points relative to the combination 30. The PLC 14 can be positioned virtually anywhere within the combination 30, but would most likely be placed within the cab of the tractor 32. Although specific blind spots 42, 44, 46 are shown, it is to be understood that such blind spots are vehicle-specific and are illustrated here as representative only. Further, the location of the proximity sensor 12 and the ambient light sensor 19 at points along the tractor 32 and trailer 34 can vary and such variance is within the scope of the present invention, as is the number of proximity sensors 12 used.

Figures 3A, 3B:
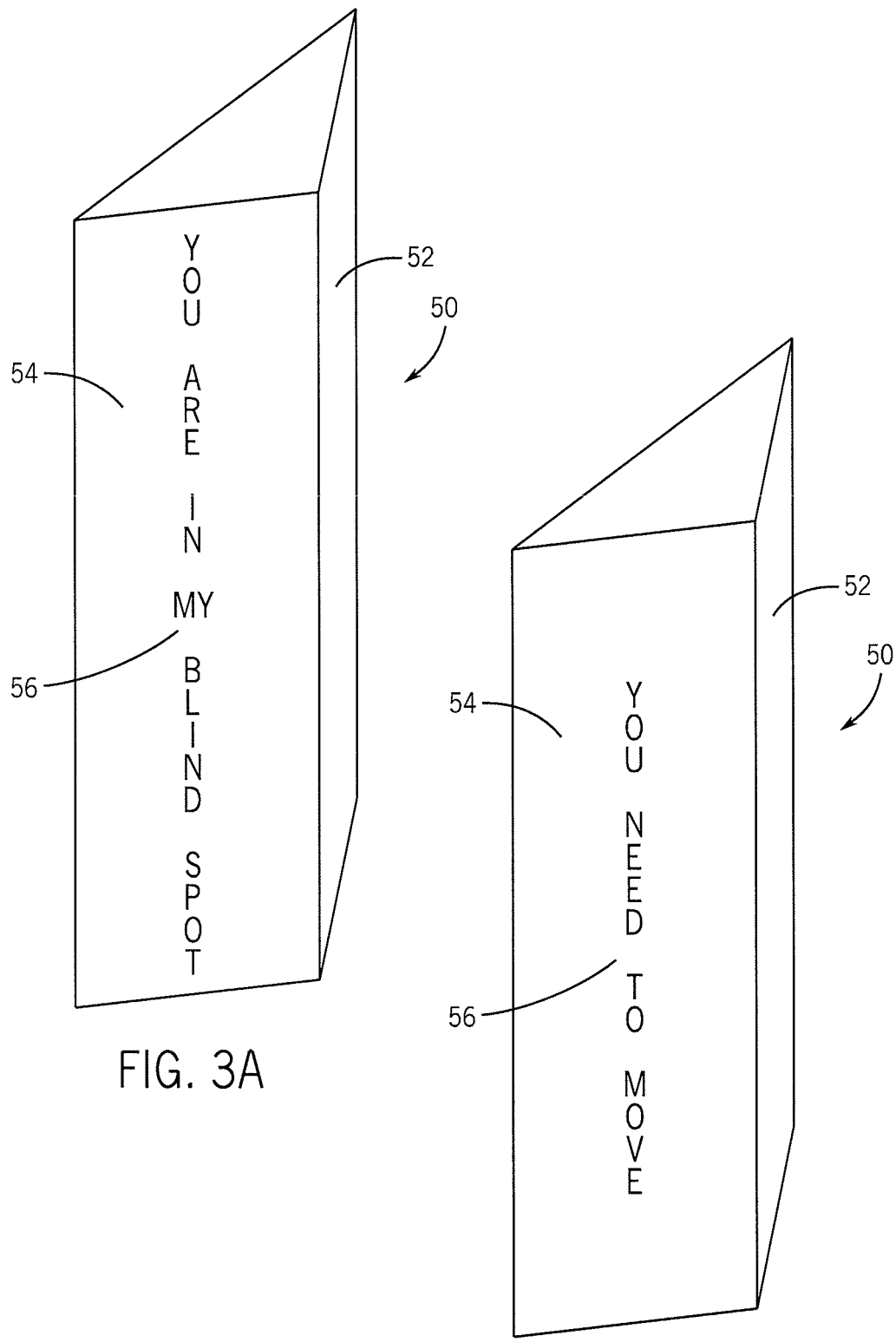
FIGS. 3A and 3B are perspective views of the light fixture that would be attached to a portion of a tractor and/or trailer and their respective letters, words or warning indicia in accordance with the present invention.

Referring now to FIGS. 3A and 3B, shows a representative light fixture, generally identified 50, which is the counterpart of the element 12 shown in the schematic diagram of FIG. 1, that is attachable to the tractor 32 or trailer 34 of the combination 30. To reduce drag on the combination 30, this inventor intends that the fixture 50 be a three-sided structure that is configured in a somewhat triangular shape when viewed from the top of the fixture 50, as shown in FIGS. 3A and 3B. The fixture 50, or several of them, would be placed at a point or a number of points 31, 33 along the tractor 32 or the trailer 34, respectively, or possibly both. See FIG. 4. Proper placement of the light fixture 50 and its light emissive element is important. As illustrated, the light fixture 50 is shown as a triangularly-shaped structure 52 having a rearwardly-directed face 54. This face 54 is the one facing other vehicles that may be in the blind spot of the tractor-trailer combination 30.

The lighted or backlit lighting and lettering, words, symbols or other warning indicia 56 are positioned along the face 54 such that the driver of a vehicle 60 within the blind spots 42, 44, 46 can easily visualize them. Again, see FIGS. 3A and 3B. Though not limiting, this inventor believes that the lettering in a preferred embodiment would be, for example, "YOU ARE IN MY BLIND SPOT." It is also within the scope of the present invention that more than one message could be displayed using the warning indicia 56. For example, it is possible that the "YOU ARE IN MY BLIND SPOT" phrase could be followed by the message "YOU NEED TO MOVE," which would then indicate to the driver of the vehicle 60 in that blind spot 42 needs to move out of that blind spot. These two phrases could be sequentially repeated until the proximity sensor 12 has detected that the vehicle 60 is now out of that blind spot 42. After a second preprogrammed amount of time following departure of the vehicle 60 from the blind spot 42, the PLC 14 will cause the light emission 17 to stop.

As alluded to earlier, it is also desirable that the warning indicia 56 not be lit each time a vehicle 60, 62 enters a blind spot. Referring back to FIG. 2, for example, it will be appreciated that a vehicle 60 passing the combination 30 on the tractor driver's side would enter the blind spot 42. This would actuate the PLC 14 to start a counting functionality via the timer 24. However, and because the vehicle 60 is moving quickly through the blind spot 42, the proximity sensor 12 will signal the non-existence of the vehicle 60 within that blind spot 42 and the fixture 50 will not be actuated. If the vehicle 60 lingers within that blind spot 42 for the preprogrammed period of time, however, the timer 24 will signal the PLC 14 to send a signal to the fixture 16, thereby actuating the light emission portion 18 of the assembly 10 and warn the driver of the vehicle 60 within the blind spot 42 that he or she should move out of that blind spot 42. Further, no light 17 is emitted when a vehicle 62 is wholly outside the blind spot 42 or passes through it within the pre-set amount of time as described above. The same functionality is true of blind spots 44 and 46.

Further, and as was also alluded to previously, the assembly 10 utilizes an ambient light sensor 19 which can send a constant feed to the PLC 14 such that actuation of the light emission portion 18 can be controlled in a way that adjusts the intensity or brightness of the light 17 being emitted by the fixture 50. During bright sunny days, the intensity would need to be greater than it would be in the dark. The PLC 14 can control the amount light 17 being emitted depending on the ambient light being detected by the sensor 19 as may be desired or required in order to optimize the ability of the other driver to visualize the warning.

It is also desirable for the foregoing functionality to be inoperative when the engine (not shown) of the tractor-trailer combination 30 not running in traffic, such as when the combination 30 is parked and even though the engine may be idling, which can be for extended periods of time. It is, however, desirable for the foregoing functionality to be fully operative when the engine is running and in traffic, such as when the tractor-trailer combination 30 is not moving in traffic or when the combination 30 is stopped at an intersection. The key notion here is that the functionality be discontinued whenever the combination is not moving, or not soon to be moving, in traffic.

Lastly, it is also desirable to adapt the foregoing functionality to an auditory mode or other visual mode, both of which are incorporated here by reference though not completely disclosed in a detailed embodiment.

As referred to in the claims below, the tractor-trailer combination 30 can be referred to simply as "a first vehicle and/or a trailer." Such "first vehicle" may be any large motor vehicle such as a straight truck, a bus, a motor home, among others that may have been mentioned in this detailed description or elsewhere in this disclosure.

The vehicles 60, 62 which may drive through or remain within a blind spot can be referred to in the claims below simply as "a second vehicle." Such "second vehicle" may be any large or small motor vehicle, but would typically comprise an automobile or small truck, among others that may have been mentioned in this detailed description or elsewhere in this disclosure.

The details of the invention having been disclosed in accordance with the foregoing, I claim:

1. A blind spot warning apparatus that is used with a first vehicle and/or a trailer, the apparatus comprising:
   an electrical supply source; at least one PLC electrically connected to the electrical supply source; at least one proximity sensor; at least one light fixture; and a visual indicator electrically connected to the at least one light fixture, the visual indicator comprising letters, words, symbols or other warning indicia to convey a visual warning to the driver of a second vehicle that is in proximity to the first vehicle and/or the trailer;
   wherein the at least one PLC uses the at least one proximity sensor to sense when a vehicle enters a blind spot of the first vehicle and/or trailer;
   initiates a timing sequence upon entry of the vehicle into the blind spot of the first vehicle and/or trailer;
   stops the timing sequence if the vehicle moves out of the blind spot within a preprogrammed period of time;
   actuates the visual indicator if the vehicle remains within the blind spot after the preprogrammed period of time, but not before, thereby causing a light emission that is visible to the driver of the vehicle after the preprogrammed period of time; and
   stops the display once the vehicle moves out of the blind spot, thereby causing the light emission to stop.

2. The blind spot warning apparatus of claim 1 wherein:
   the at least one proximity sensor is electrically connected to or, alternatively, wirelessly in communication with, the at least one PLC; and
   the at least one light fixture is electrically connected to or, alternatively, wirelessly in communication with, the at least one PLC.

3. The blind spot warning apparatus of claim 1 further comprising:
   a secondary sensor that senses ambient light conditions; and
   means for adjusting the intensity of light emitted from the visual indicator based on the ambient light that is sensed by the secondary sensor.

4. The blind spot warning apparatus of claim 1 wherein multiple PLCs are provided for the at least one proximity sensor and the at least one light fixture.

5. The blind spot warning apparatus of claim 1 wherein the at least one proximity sensor and the at least one light fixture are mountable to a portion of the first vehicle.

6. A method of providing a warning to the driver of a vehicle that the vehicle has entered into and remains within a blind spot of a first vehicle, method comprising the steps of:
   providing the apparatus of claim 1;
   mounting a proximity sensor to the first vehicle;
   using the proximity sensor to sense when a vehicle enters a blind spot of the first vehicle;
   initiating a timing sequence with the PLC upon entry of the vehicle into the blind spot of the first vehicle;
   stopping the timing sequence if the vehicle moves out of the blind spot within a preprogrammed period of time;
   actuating a display with a visual indicator if the vehicle remains within the blind spot a after the preprogrammed period of time, but not before, thereby causing a light emission that is visible to the driver of the vehicle after the preprogrammed period of time; and
   stopping the display once the vehicle moves out of the blind spot, thereby causing the light emission to stop.

7. The method of claim 6 further comprising the steps of providing an ambient light sensor and adjusting light intensity based on the ambient light that is sensed by the ambient light sensor.

* * * * *